US012337600B2

(12) United States Patent
Takahashi et al.

(10) Patent No.: US 12,337,600 B2
(45) Date of Patent: Jun. 24, 2025

(54) LIQUID EJECTION HEAD

(71) Applicant: RISO Technologies Corporation, Tokyo (JP)

(72) Inventors: Keita Takahashi, Mishima Shizuoka (JP); Takashi Tozuka, Sunto Shizuoka (JP); Minoru Koyata, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 116 days.

(21) Appl. No.: 18/334,211

(22) Filed: Jun. 13, 2023

(65) Prior Publication Data

US 2024/0066867 A1 Feb. 29, 2024

(30) Foreign Application Priority Data

Aug. 26, 2022 (JP) ................................ 2022-135260

(51) Int. Cl.
*B41J 2/14* (2006.01)

(52) U.S. Cl.
CPC .. *B41J 2/14233* (2013.01); *B41J 2002/14306* (2013.01)

(58) Field of Classification Search
CPC .......... B41J 2/14233; B41J 2002/14306; B41J 2002/14491; B41J 2/14209; B41J 2202/08; B41J 2/14; B41J 2002/14419
See application file for complete search history.

(56) References Cited

U.S. PATENT DOCUMENTS

| | | | |
|---|---|---|---|
| 7,905,581 | B2 | 3/2011 | Kawaguchi |
| 10,513,117 | B2 | 12/2019 | Nakayama |
| 2007/0188560 | A1 | 8/2007 | Zapka |
| 2012/0050413 | A1 | 3/2012 | Miyazawa |

(Continued)

FOREIGN PATENT DOCUMENTS

| | | | | |
|---|---|---|---|---|
| EP | 2119567 | A1 | 11/2009 | |
| EP | 2803486 | A1 * | 11/2014 | .......... B41J 2/14209 |
| EP | 3378652 | A1 | 9/2018 | |

(Continued)

OTHER PUBLICATIONS

Kawaguchi Shinichi, "Inkjet Head and Method for Leading Out Wiring Line of Inkjet Head" (EP 2 803 486 A1), Nov. 1, 20149, Description of preferred embodiments: Fifth Embodiments (Year: 2014).*

(Continued)

*Primary Examiner* — Lisa Solomon
(74) *Attorney, Agent, or Firm* — Kim & Stewart LLP

(57) ABSTRACT

According to one embodiment, a liquid ejection head includes a substrate with a hole, a nozzle plate with a plurality of nozzles, and an actuator on a first surface of the substrate. The actuator has a plurality of pressure chambers aligned to the plurality of nozzles. An electrode has a first portion on the first surface of the substrate and a second portion on a second surface of the substrate. The second surface is on an opposite side of the substrate from the first surface. A manifold has a first liquid hole facing the hole in the substrate and a second liquid hole facing another portion of the substrate other than the hole. A shielding member is between the substrate and the manifold and covers the second liquid hole.

20 Claims, 14 Drawing Sheets

(56) References Cited

U.S. PATENT DOCUMENTS

| | | | |
|---|---|---|---|
| 2023/0087927 | A1 | 3/2023 | Tozuka |

FOREIGN PATENT DOCUMENTS

| | | | |
|---|---|---|---|
| JP | 2013103488 | A | 5/2013 |
| JP | 2018122551 | A | 8/2018 |
| WO | 2005082629 | A1 | 9/2005 |

OTHER PUBLICATIONS

U.S. Appl. No. 18/322,992, filed May 24, 2023.
U.S. Appl. No. 18/324,870, filed May 26, 2023.
Extended European Search Report dated Jan. 16, 2024, mailed in counterpart European Application No. 23184097.6, 8 pages.

* cited by examiner

LIQUID EJECTION HEAD

CROSS-REFERENCE TO RELATED APPLICATION

This application is based upon and claims the benefit of priority from Japanese Patent Application No. 2022-135260, filed Aug. 26, 2022, the entire contents of which are incorporated herein by reference.

FIELD

Embodiments described herein relate generally to a liquid ejection head.

BACKGROUND

In a liquid ejection head that ejects a liquid such as an ink, the amount of heat generated by a piezoelectric material, such as lead zirconate titanate (PZT), increases as the driving frequency increases. In order to efficiently control the temperature, it is usually necessary to provide a temperature control fluid flow path near the piezoelectric material.

In addition, in such liquid ejection heads if the resistance value of a common electrode used in driving ejections increases, latch-up of a driver IC may occur, which leads to a failure of the liquid ejection head. Since an increase in the area occupied by the common electrode reduces the resistance value of the common electrode, it is common for electrodes or portions thereof to be on both sides of the liquid ejection head substrate.

However, with such an arrangement, the temperature control fluid (e.g., cooling water) may flow over the common electrode portion provided on the back surface of the substrate, so that there is a concern that the common electrode may be corroded by this interaction with the temperature control fluid. It is noted that corrosion may be a problem for the common electrode or any other electrode in contact with any liquid/fluid, whether used as the temperature control fluid or not. Thus, even in a liquid ejection head in which an electrode portion other than the common electrode is provided on the back surface of the substrate, there remains a concern with possible corrosion.

DETAILED DESCRIPTION

The present disclosure concerns in general the prevention of electrode corrosion in a liquid ejection head.

In general, according to one embodiment, a liquid ejection head includes a substrate with a hole, a nozzle plate with a plurality of nozzles, and an actuator on a first surface of the substrate. The actuator has a plurality of pressure chambers aligned to the plurality of nozzles. An electrode has a first portion on the first surface of the substrate and a second portion on a second surface of the substrate. The second surface is on an opposite side of the substrate from the first surface. A manifold has a first liquid hole facing the hole in the substrate and a second liquid hole facing another portion of the substrate other than the hole. A shielding member is between the substrate and the manifold and covers the second liquid hole.

Figure 1:
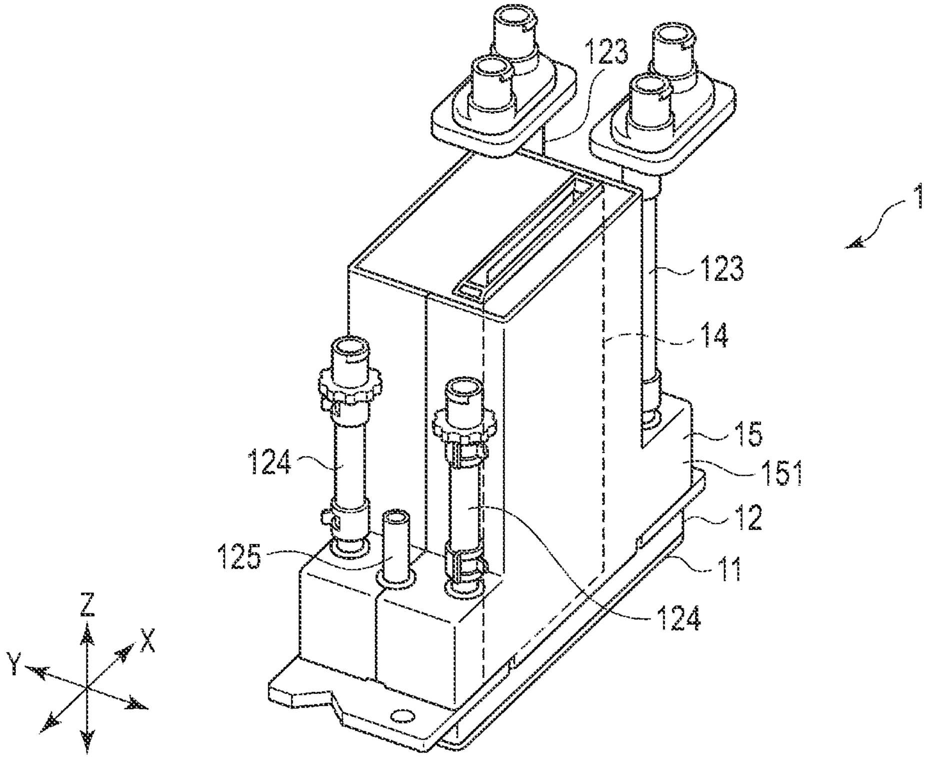
FIG. 1 is a perspective view of a liquid ejection head according to an embodiment.
Figure 2:
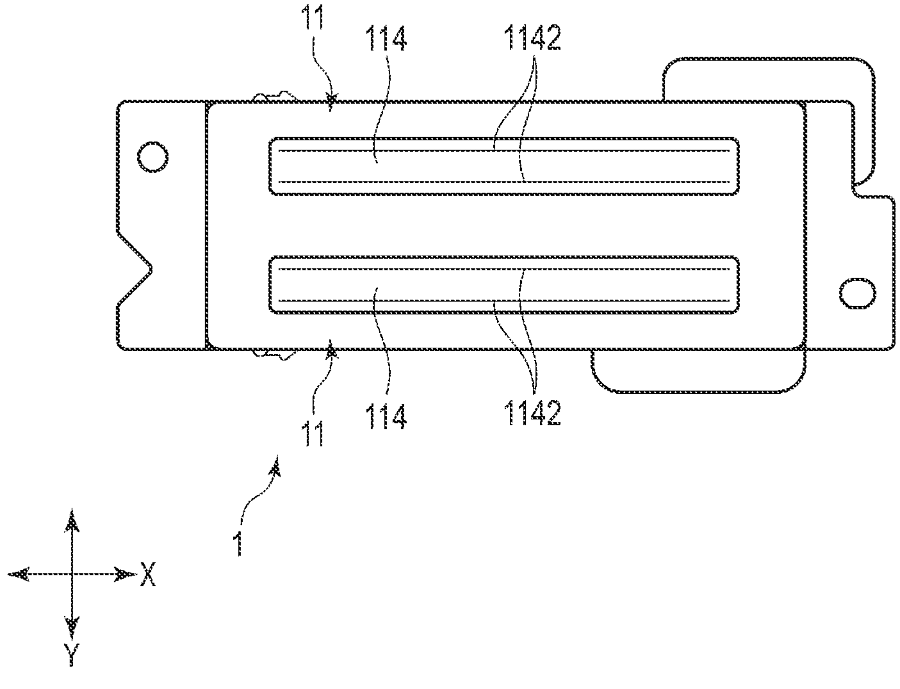
FIG. 2 is a bottom view of a liquid ejection head according to an embodiment.
Figure 3:
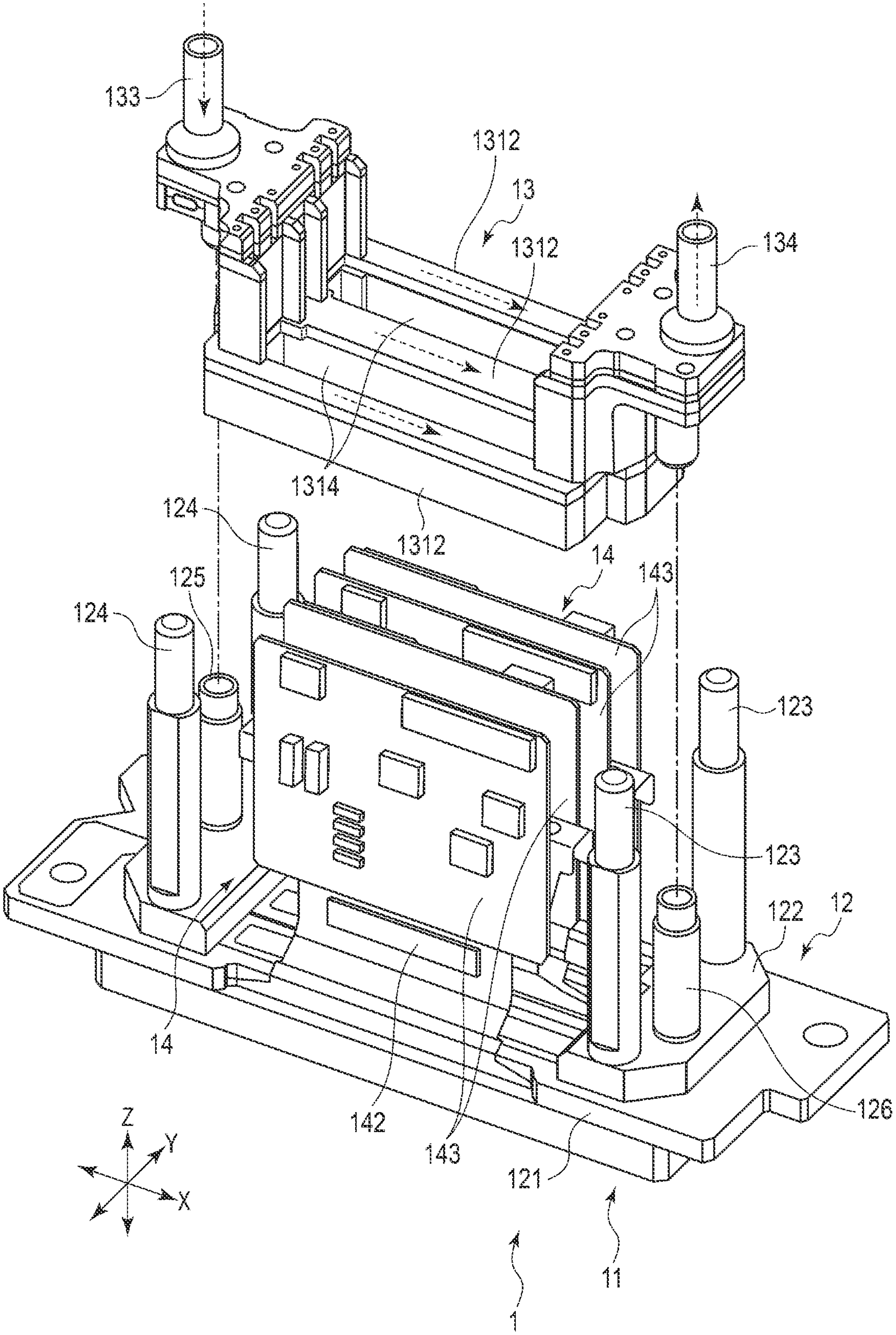
FIG. 3 is an exploded perspective view of a liquid ejection head according to an embodiment.
Figure 4:
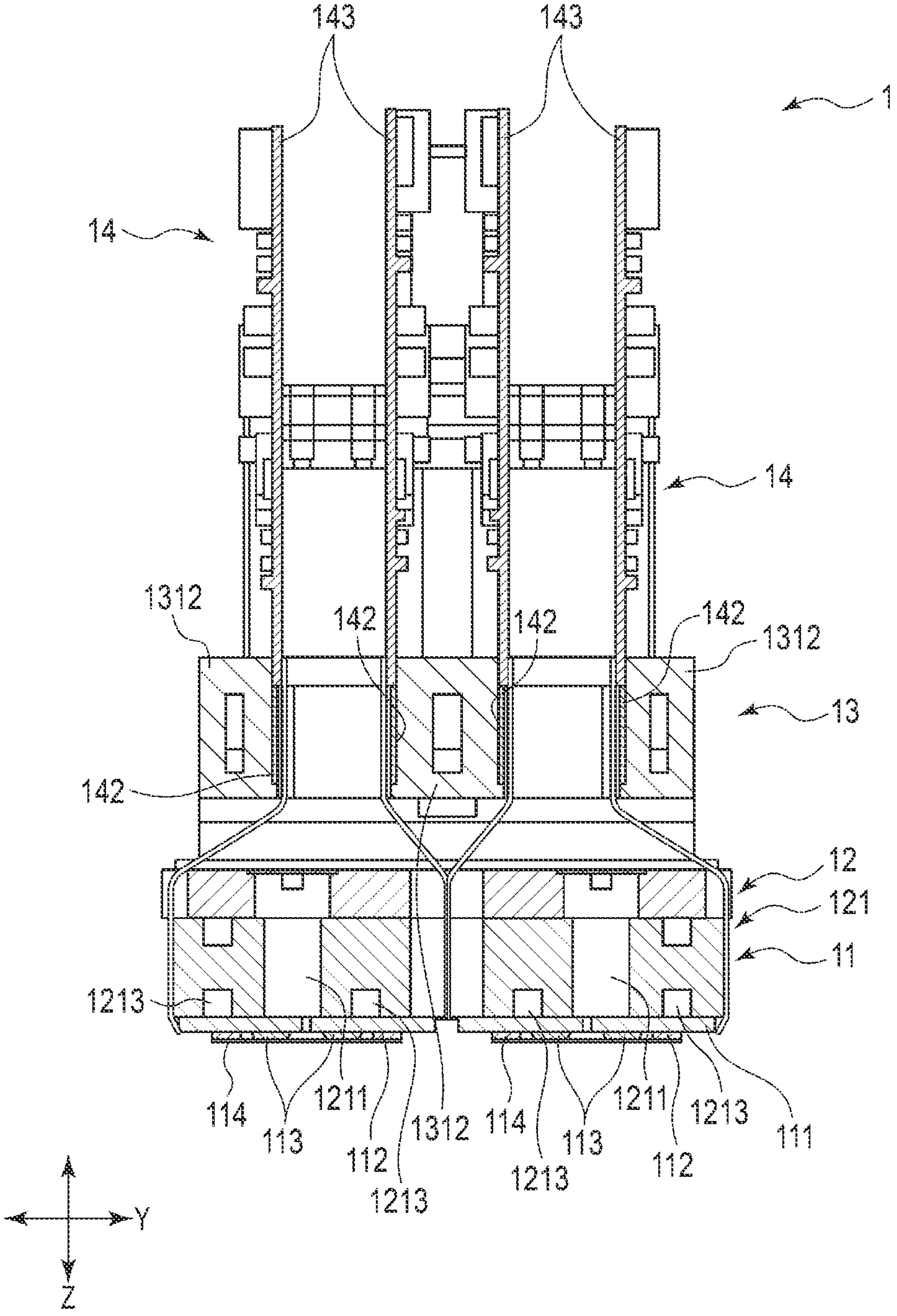
FIG. 4 is a cross-sectional view of a head body.
Figure 5:
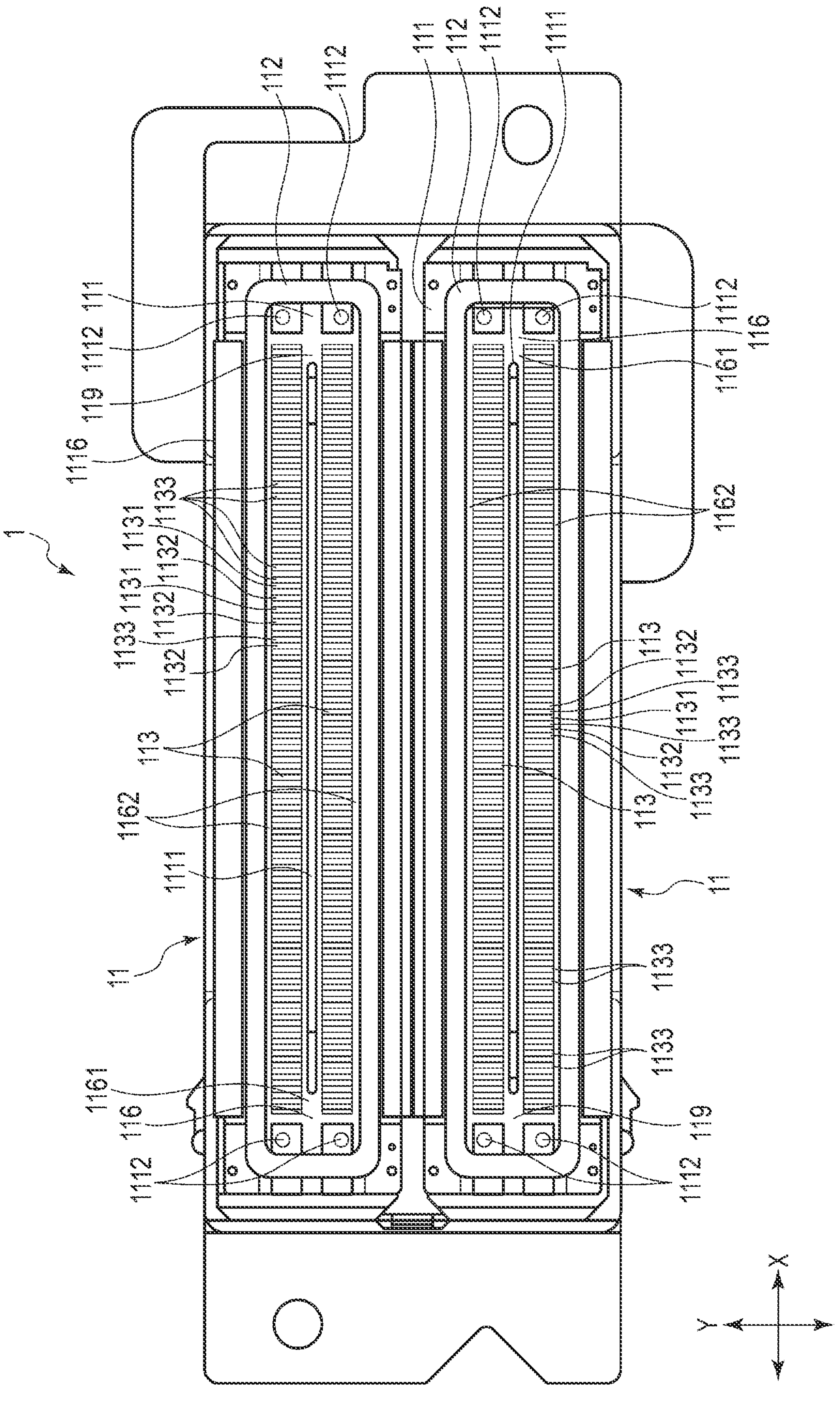
FIG. 5 is a bottom view of a head body.
Figure 6:
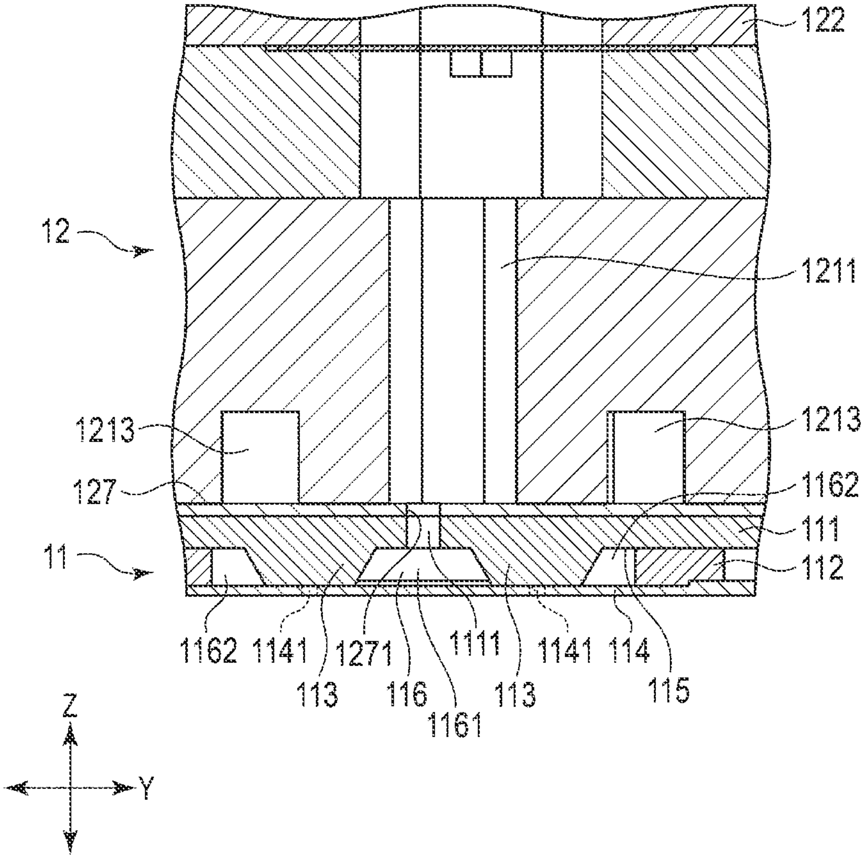
FIG. 6 is a cross-sectional view of a portion of a head body.
Figure 7:
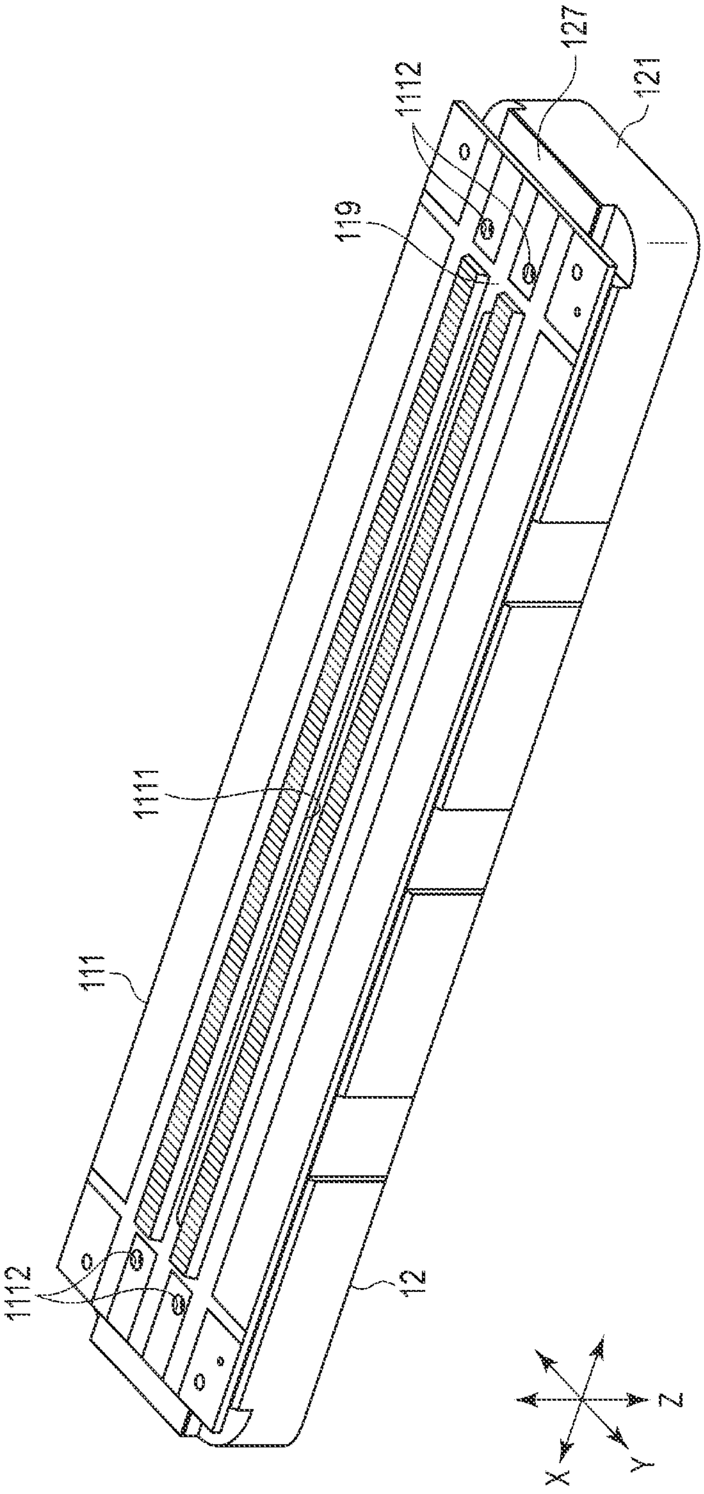
FIG. 7 is a perspective view of a portion of a head body.
Figure 9:
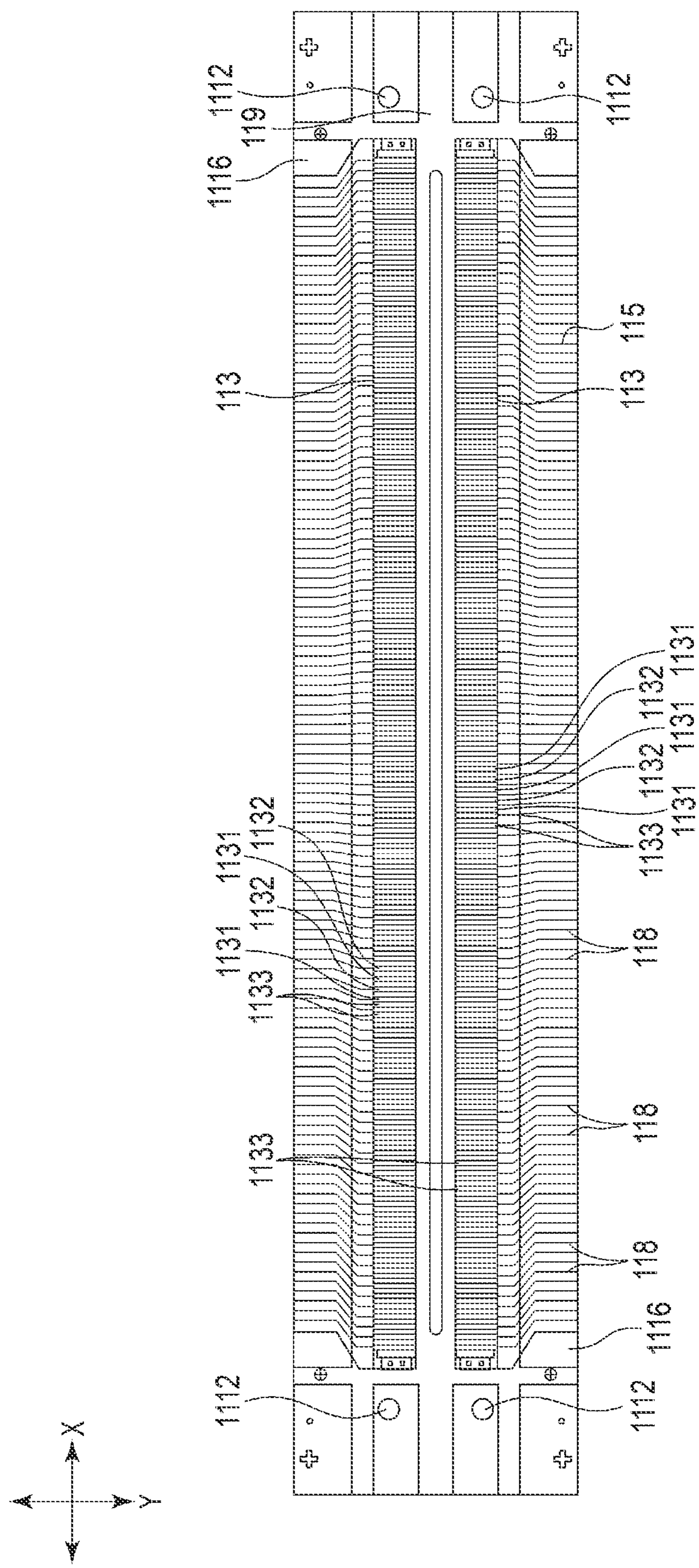
FIG. 9 is a bottom view of a portion of a head body.
Figure 10:
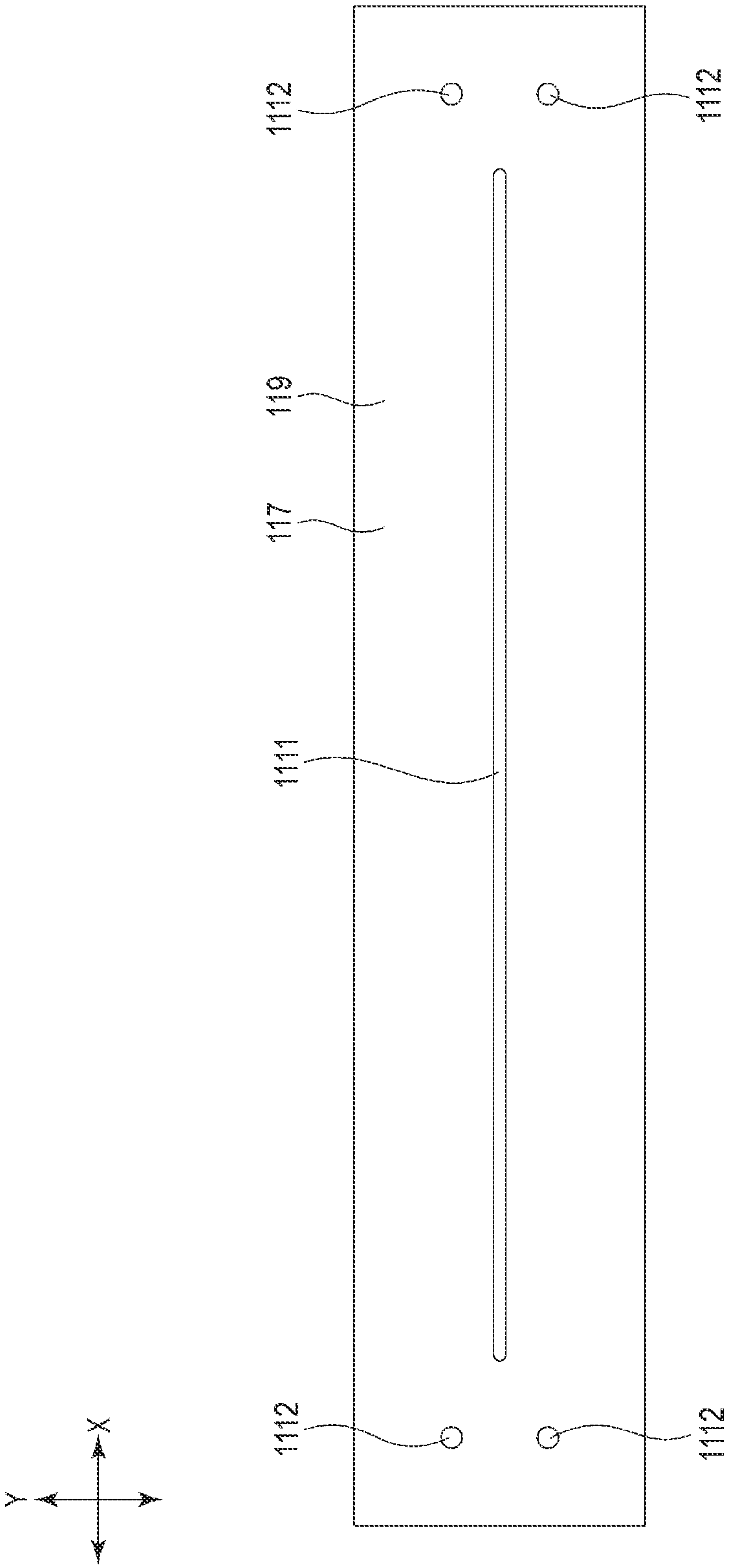
FIG. 10 is a plan view of a portion of a head body.
Figure 11:
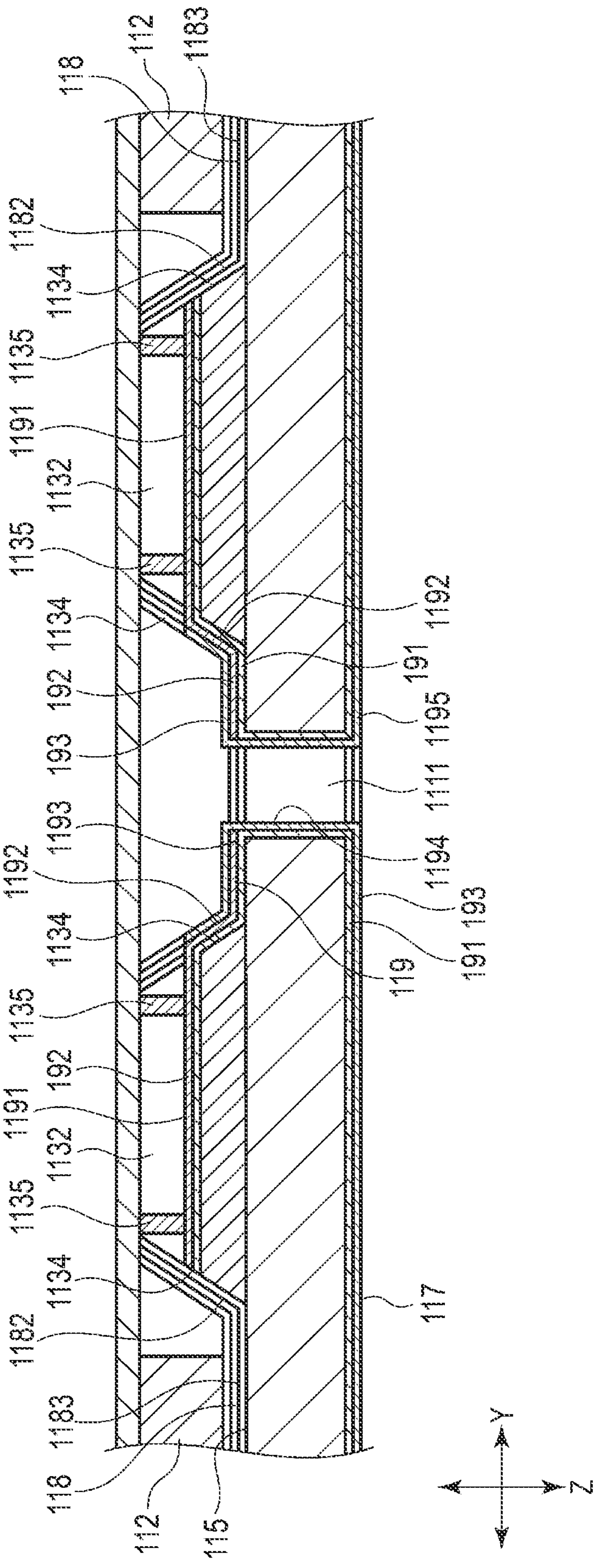
FIG. 11 is a cross-sectional view of a portion of a head body.
Figure 12:
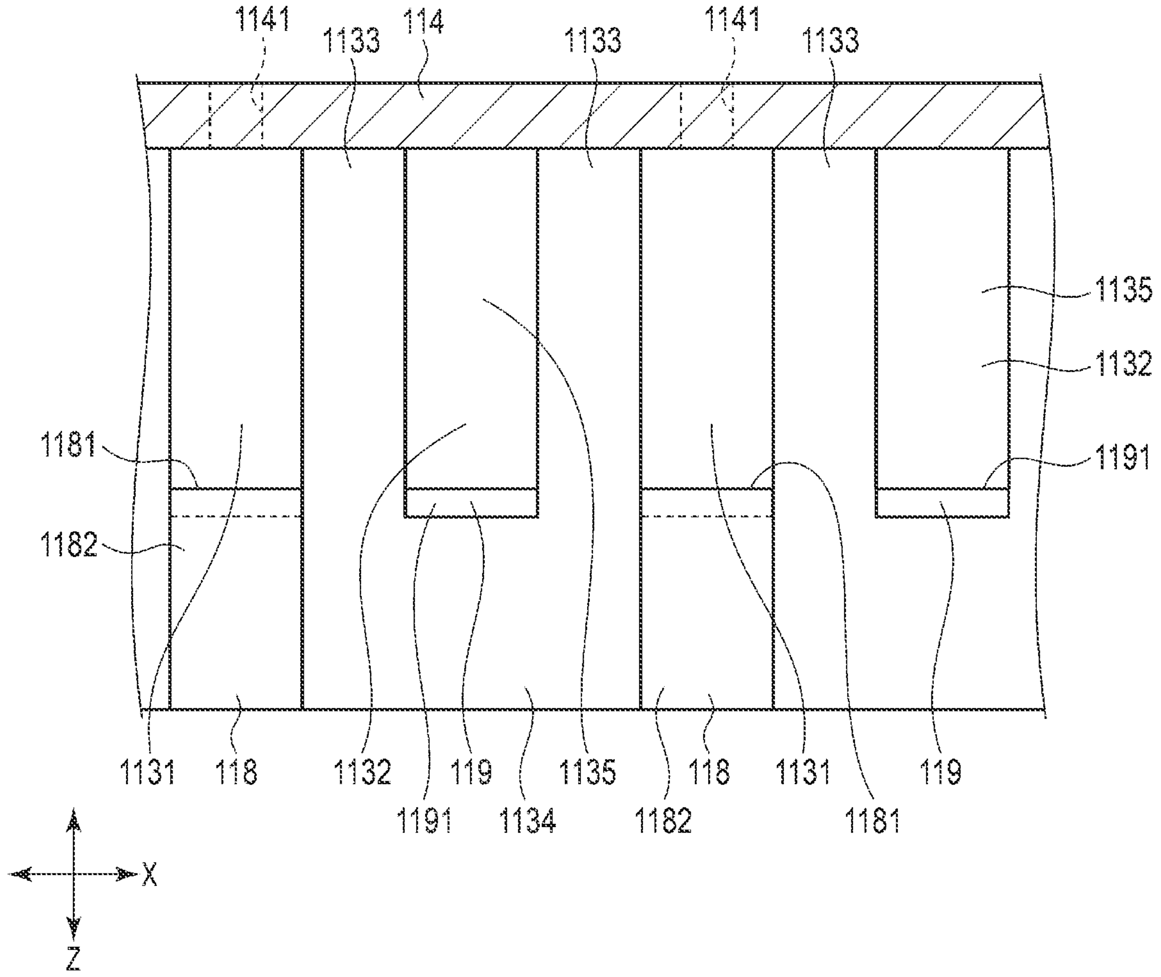
FIG. 12 is a cross-sectional view of a portion of a head body.
Figure 13:
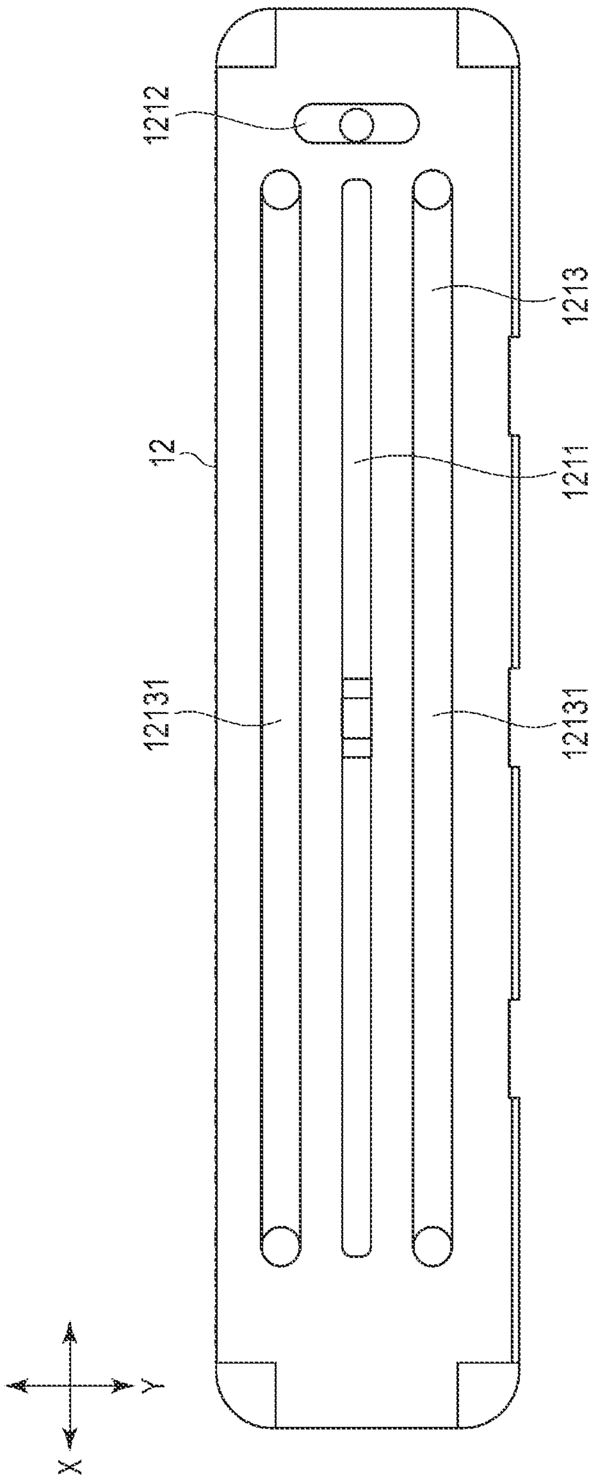
FIG. 13 is a bottom view of a manifold.
Figure 14:
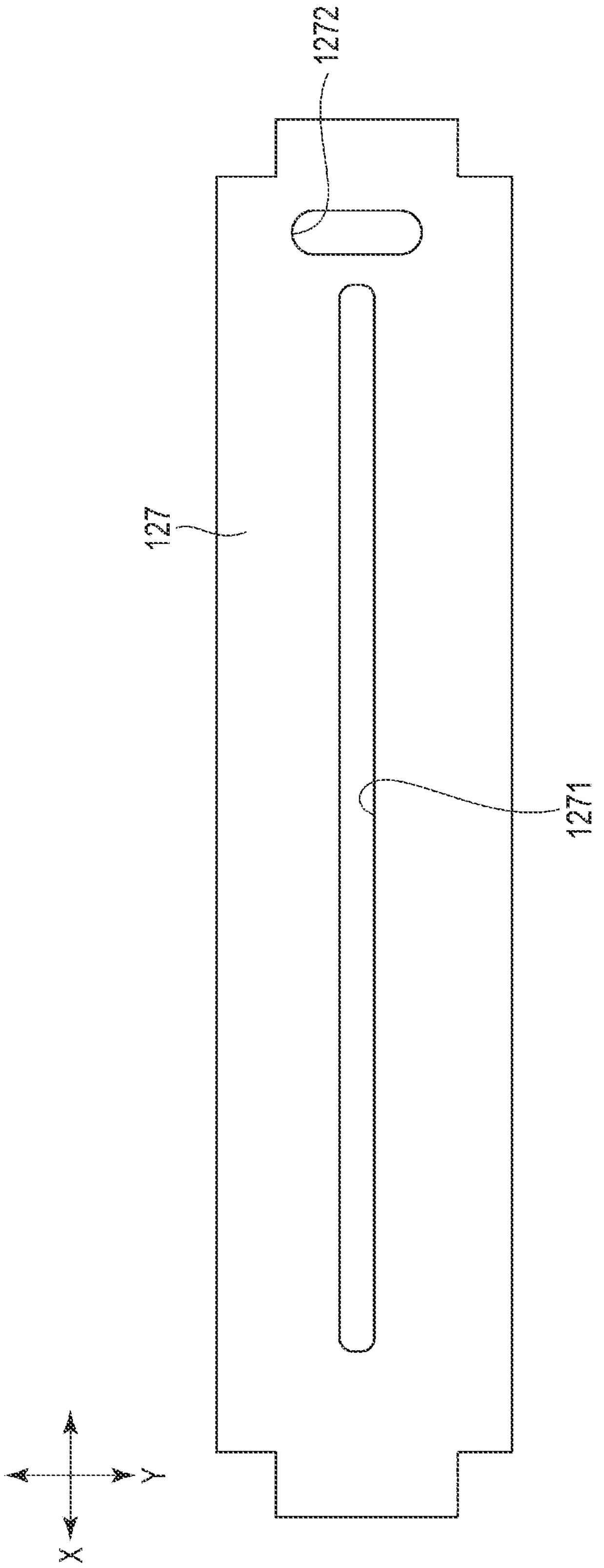
FIG. 14 is a plan view of a portion of a shielding member.
Figure 15:
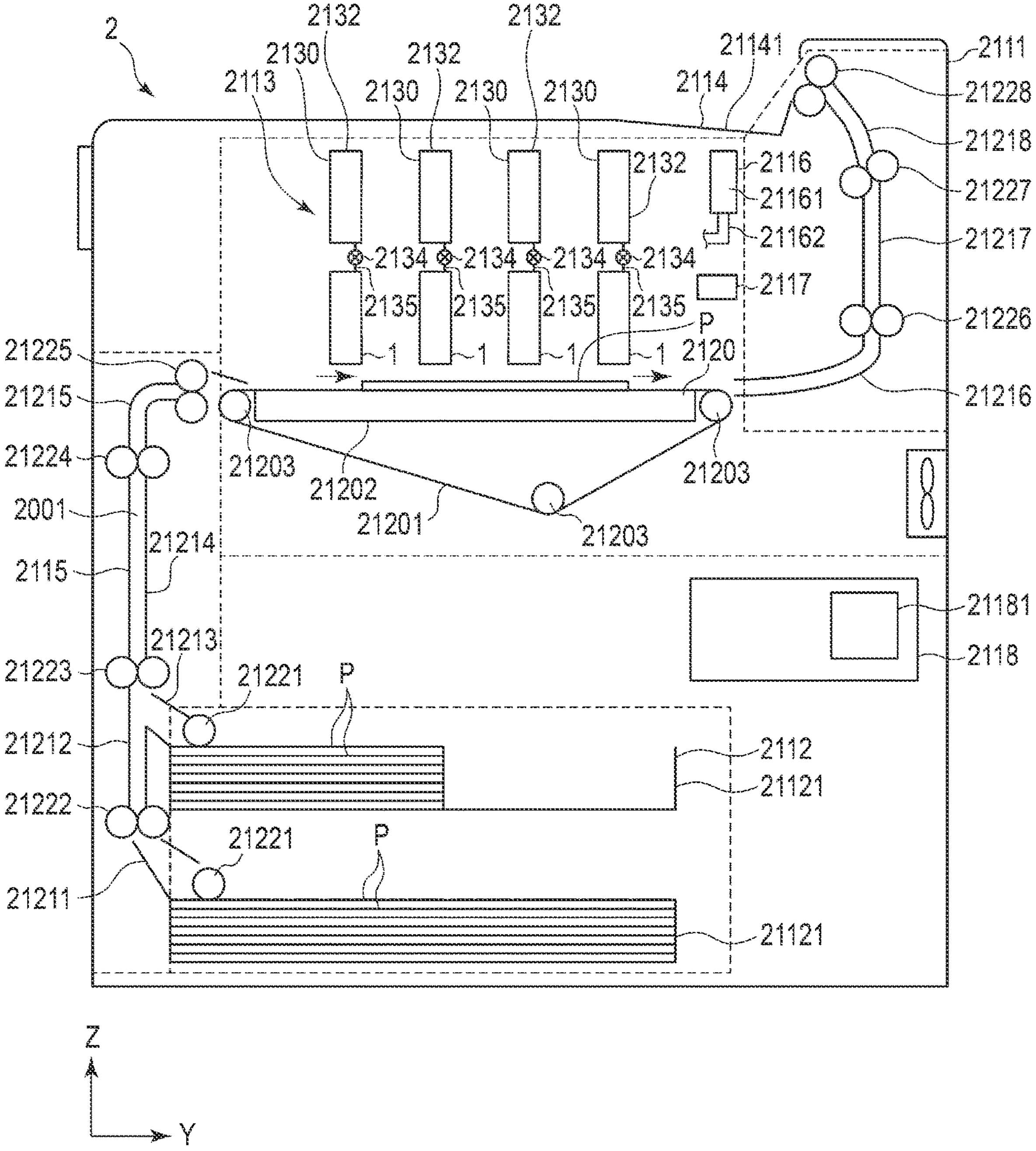
FIG. 15 is a schematic diagram of a liquid ejection apparatus.

Hereinafter, a liquid ejection head 1 and a liquid ejection apparatus 2 incorporating the liquid ejection head 1 will be described with reference to FIGS. 1 to 15. FIG. 1 is a perspective view illustrating a configuration of the liquid ejection head 1 according to the embodiment. FIG. 2 is a bottom view illustrating the configuration of the liquid ejection head 1. FIG. 3 is an exploded perspective view of the liquid ejection head 1. FIG. 4 is a cross-sectional view illustrating a configuration of a head body 11. FIG. 5 is a bottom view of the liquid ejection head. FIG. 6 is a cross-sectional view illustrating a portion of the head body. FIG. 9 is a bottom view illustrating the configuration of the liquid ejection head 1 with a nozzle plate 114 omitted. FIG. 10 is a plan view illustrating the configuration of the back side of a substrate 111. FIGS. 11 and 12 are cross-sectional views illustrating a configuration of a portion of the head body 11. FIG. 13 is a bottom view illustrating the configuration of a manifold 121, and FIG. 14 is a plan view illustrating the configuration of a shielding member 127. FIG. 15 is an explanatory diagram illustrating the configuration of the liquid ejection apparatus 2. In the figures, X, Y, and Z indicate three directions perpendicular to each other. It is noted that, in each figure, for the sake of description, aspects may be illustrated as enlarged, reduced, or omitted as appropriate.

The liquid ejection head 1 is, for example, a shear-mode inkjet head provided in the liquid ejection apparatus 2, such as an inkjet recording apparatus illustrated in FIG. 15. The liquid ejection head 1 has, for example, an independent drive structure where pressure chambers 1131 and air chambers 1132 are alternately provided. The liquid ejection head 1 is provided in a head unit 2130 including a supply tank 2132 as a liquid container provided in the liquid ejection apparatus 2.

The liquid ejection head 1 is supplied with ink or other liquid stored in the supply tank 2132. The ink is also referred to as a first liquid. It is noted that the liquid ejection head 1 may be a non-circulation type head that does not circulate the ink or may be a circulation type head through which the ink circulates. In the present embodiment, the liquid ejection head 1 will be described by using an example of a non-circulation type head. The liquid ejection head 1 is connected to a temperature control device 2116 provided in the liquid ejection apparatus 2 and is supplied with a temperature control fluid (also referred to as a second liquid) for controlling temperature in the liquid ejection head 1 and/or the ink.

As illustrated in FIGS. 1 to 5, the liquid ejection head 1 includes a head body 11, a manifold unit 12, a temperature control flow path unit 13, a circuit board 14, and a cover 15. For example, the liquid ejection head 1 is a side shooter type, four-row integrated structure head having a pair of head bodies 11, each head body 11 having a pair of actuators 113.

The head body 11 ejects liquid (e.g., ink). The head body 11 includes a substrate 111, a frame 112, an actuator 113 having the plurality of pressure chambers 1131 and the plurality of air chambers 1132, and a nozzle plate 114.

The head body 11 has a common liquid chamber 116 communicating with (connected to) the plurality of pressure chambers 1131 of the actuator 113. A primary side of the plurality of pressure chambers 1131 is the upstream side of the plurality of pressure chambers 1131 in a liquid flowing direction. A secondary side of the plurality of pressure chambers 1131 is the downstream side of the plurality of pressure chambers 1131 in the liquid flowing direction.

In addition, the head body 11 has an electrode portion formed from an electrode film formed on the substrate 111 and the actuator 113. Specifically, the head body 11 has, as electrode portions, a plurality of individual electrodes 118 respectively driving the plurality of pressure chambers 1131 of the actuator 113, and at least one common electrode 119 for the plurality of pressure chambers 1131 as a group.

In the present example, each head body 11 has two actuators 113 and the common liquid chamber 116 has one first common liquid chamber 1161 and two second common liquid chambers 1162. The common liquid chamber 116 includes, for example, the first common liquid chamber 1161 communicating with primary side openings (inlets of the pressure chambers 1131) of the plurality of pressure chambers 1131 of an actuator 113 and the second common liquid chamber 1162 communicating with secondary side openings (outlets of the pressure chamber 1131) of the plurality of pressure chambers 1131 of the actuator 113.

The substrate 111 is formed in a rectangular plate shape from a ceramic material such as alumina. The substrate 111 has a front surface 115 which is a polished surface and a back surface 117. The substrate 111 is formed, for example, in a rectangular shape elongated in one direction (X direction). A third electrode portion 1183 (which is a portion of the plurality of individual electrodes 118) and a third electrode portion 1193 (which is a portion of one common electrode 119) are formed on the front surface 115 of the substrate 111. The pair of actuators 113 are provided on the front surface 115 of the substrate 111 to be aligned in a lateral direction (Y direction) of the substrate 111. The substrate 111 has one supply port 1111, which is a hole through which the ink flows, and a plurality of discharge ports 1112, which are holes through which the ink flows for discharge. The supply port 1111 and the discharge port 1112 are through-holes penetrating the substrate 111.

The supply port 1111 is an inlet for supplying the ink to the first common liquid chamber 1161. The supply port 1111 is a through-hole formed in the center of the substrate 111 in the lateral direction. The supply port 1111 extends along the longitudinal direction of the substrate 111. In other words, the supply port 1111 is, for example, an elongated hole or slot elongated in the longitudinal direction of the actuator 113 and the first common liquid chamber 1161. The supply port 1111 is provided between the pair of actuators 113 and opens at the position facing the first common liquid chamber 1161.

A fourth electrode portion 1194 (which is a portion of the common electrode 119) is formed on an inner wall surface of the supply port 1111.

The discharge port 1112 is an outlet for discharging the ink from the first common liquid chamber 1161, the pressure chamber 1131, and the second common liquid chamber 1162. A plurality of (for example, four) discharge ports 1112 are provided. Each discharge port 1112 is, for example, between the first common liquid chamber 1161 and one of the second common liquid chambers 1162 and adjacent to both end portions of the pair of actuators 113 in the longitudinal direction. It is noted that the plurality of discharge ports 1112 may be provided in the second common liquid chamber 1162 in some examples.

The actuator 113 and the frame 112 are provided on the substrate 111. The inside of the frame 112 serves as the liquid contact area where the ink can be present, and outside of the frame 112 is a mounting area to which various electronic components can be connected.

The frame 112 is fixed to one side of the substrate 111 with adhesive or the like. The frame 112 surrounds the supply port 1111, the plurality of discharge ports 1112, and the actuator(s) 113 provided in or on the substrate 111.

For example, the frame 112 is formed in a rectangular frame shape. The frame 112 may have a stepped structure where a portion of the front surface is recessed. The pair of actuators 113, the supply port 1111, and the four discharge ports 1112 are arranged inside the opening of the frame 112. The frame 112 surrounds the actuator 113 between the nozzle plate 114 and the substrate 111 and is configured to retain liquid inside.

The pair of actuators 113 are adhered to the front surface 115 of the substrate 111. The pair of actuators 113 are in separate rows with the supply port 1111 interposed therebetween. Each actuator 113 is formed in a plate shape elongated in one direction. The actuators 113 are arranged inside the opening of the frame 112 and adhered to the front surface 115 of the substrate 111.

The actuator 113 has pressure chambers 1131 arranged at equal intervals in the longitudinal direction and air chambers 1132 arranged at equal intervals in the longitudinal direction between otherwise adjacent pressure chambers 1131. In other words, the actuator 113 has a plurality of pressure chambers 1131 and air chambers 1132 that are alternately arranged with each other along the longitudinal direction. The plurality of pressure chambers 1131 and the plurality of air chambers 1132 extend in a direction intersecting an alignment direction, for example, in the lateral direction of the actuator 113.

A top surface of the actuator 113 opposite to the substrate 111 is adhered to the nozzle plate 114. The actuators 113 are arranged to be aligned at equal intervals in the longitudinal direction, and the plurality of grooves are formed along a direction perpendicular to the longitudinal direction. The plurality of grooves form the pressure chambers 1131 and air chambers 1132. In other words, the actuator 113 has a plurality of piezoelectric bodies 1133 as walls (sidewalls) of the grooves between the piezoelectric bodies 1133. The piezoelectric bodies 1133 are thus arranged at equal intervals in the longitudinal direction and can function as drive elements for changing the volume of the pressure chambers 1131 when a drive voltage is applied.

For example, the width of the actuator 113 in the lateral direction gradually increases from a top side toward the substrate 111 side. A cross-sectional shape of the cross section along a direction (lateral direction) perpendicular to the longitudinal direction of the actuator 113 is formed in a trapezoidal shape. That is, the actuator 113 has an inclined surface 1134 that is inclined on the side portion in the lateral direction. The side portion (inclined surface 1134) is arranged to face the first common liquid chamber 1161 and the second common liquid chamber 1162. A second electrode portion 1182 which is a portion of the plurality of individual electrodes 118 and a second electrode portion 1192 which is a portion of one or a plurality of the common electrodes 119 are formed on the inclined surface 1134.

As a specific example, the actuator 113 is formed of the stacked piezoelectric material in which two layers of piezoelectric materials are adhered to each other so that the polarization directions are opposite to each other. Herein, the piezoelectric material is, for example, PZT (lead zirconate titanate). The actuator 113 is adhered to the front surface 115 of the substrate 111 by, for example, thermosetting epoxy adhesive. The inclined surface 1134 of the actuator 113 may be formed by, for example, cutting of the initially stacked layers of piezoelectric material. The substrate 111 and the actuator 113 the front surface 115 on which the plurality of individual electrodes 118 and the common electrode (s) 119 are formed is a polished surface. The grooves for forming the plurality of pressure chambers 1131 and the plurality of air chambers 1132 can be formed by cutting of the initially stacked layers of piezoelectric material.

In addition, a first electrode portion 1181 and the second electrode portion 1182, which are each a portion of the plurality of individual electrodes 118, and a first electrode portion 1191 and the second electrode portion 1192, which are each a portion of a common electrode 119 are formed in the actuator 113.

The pressure chambers 1131 are deformed when the liquid ejection head 1 performs an operation such as printing, so that the ink is ejected from nozzles 1141. The pressure chamber 1131 has an inlet connected to the first common liquid chamber 1161 and an outlet connected to the second common liquid chamber 1162. The ink flows into the pressure chamber 1131 from the inlet, and the ink flows out from the outlet. It is noted that, in other examples, the pressure chamber 1131 may have a configuration where the ink flows in from both the openings described as the inlet and the outlet in the present example. The first electrode portions 1181 are formed in the grooves constituting the pressure chambers 1131.

As illustrated in FIGS. 11 and 12, the air chamber 1132 has an inlet side and an outlet side, but both are closed by a liquid-proof wall (resin wall) 1135 formed of a photosensitive resin or the like, so that the air chamber 1132 is separated (blocked) from the first common liquid chamber 1161 and the second common liquid chamber 1162. The first electrode portion 1191 as a portion of one or a plurality of the common electrodes 119 is formed in the air chamber 1132. As a specific example, the liquid-proof wall 1135 of the air chamber 1132 can be formed by injecting an ultraviolet curing resin onto the first electrode portion 1191 in the groove forming the air chamber 1132, and after that, selectively irradiating the area using an exposure mask or the like with ultraviolet rays. The liquid-proof wall 1135 prevents the ink from invading the air chamber 1132. In addition, the air chamber 1132 is covered by the nozzle plate 114, and a nozzle 1141 is not arranged to connect to the air chamber 1132. Therefore, the ink can not flow into the air chamber 1132.

The nozzle plate 114 is fixed to the frame 112 opposite to the substrate 111 with adhesive or the like. The nozzle plate 114 has the plurality of nozzles 1141 formed at positions facing the plurality of pressure chambers 1131. In the present embodiment, the nozzle plate 114 has two nozzle rows 1142.

The first common liquid chamber 1161 is formed between the middle portions of the pair of actuators 113, and constitutes an ink flow path from the supply port 1111 to the primary side openings (inlets) of the pressure chambers 1131 of each actuator 113. The first common liquid chamber 1161 extends along the longitudinal direction of the actuator 113. The first common liquid chamber 1161 constitutes a portion of an ink flow path which is also referred to as a second flow path.

The second common liquid chamber 1162 is formed between an actuator 113 and the frame 112. The second common liquid chamber 1162 forms the ink flow path from the secondary side openings (outlets) of the pressure chambers 1131 to a discharge port 1112. The second common liquid chamber 1162 extends along the longitudinal direction of the actuator 113. The second common liquid chamber 1162 constitutes a portion of the ink flow path (second flow path).

The individual electrodes 118 individually apply drive voltages to the plurality of piezoelectric bodies 1133. The plurality of individual electrodes 118 can be used to selectively deform the respective pressure chambers 1131. The individual electrode 118 is formed by a wiring pattern portion formed on the substrate 111 and a wiring pattern portion formed on the actuator 113. The plurality of individual electrodes 118 extend from the plurality of pressure chambers 1131 along the lateral direction of the actuators 113 and are drawn out to a region of an outer side of the pair of actuators 113.

As a specific example, as illustrated in FIGS. 9 and 11, the individual electrodes 118 are deposited on the inner surface of each pressure chamber 1131, the inclined surface 1134 of an actuator 113, and the substrate 111. A portion of the individual electrode 118 formed on the inner surface of the pressure chamber 1131 is formed on a side surface of the piezoelectric body 1133 forming the pressure chamber 1131 and a bottom surface of the groove forming the pressure chamber 1131. In addition, the individual electrodes 118 are formed on the inclined surface 1134 and a portion of the front surface 115 of the substrate 111. The individual electrodes 118 extend from the pressure chambers 1131 to the edges of the substrate 111 in the lateral direction, and the ends of the individual electrodes 118 are arranged at the connection portions 1116 to which the circuit board 14 of the substrate 111 is connected. That is, the individual electrode 118 includes the first electrode portion 1181 formed in the groove constituting the pressure chamber 1131 of the actuator 113, the second electrode portion 1182 formed on the inclined surface 1134 of the actuator 113, and the third electrode portion 1183 formed on the front surface 115 of the substrate 111. The individual electrode 118 is provided in close contact with the bottom surface of the groove forming the pressure chamber 1131 and the side surface of the piezoelectric body 1133 forming the pressure chamber 1131. The individual electrode 118 is formed by stacking, for example, a nickel (Ni) sputtered film 191, an electroless Ni plated film 192, and an electrolytic gold (Au) plated film 193. The thickness of the individual electrode 118 is, for example, 0.5 μm to 5 μm.

Specifically, each of the first electrode portion 1181, the second electrode portion 1182, and the third electrode portion 1183 is configured to have a three-layer stacked structure of a Ni sputtered film 191, an electroless Ni plated film 192, and an electrolytic Au plated film 193. In some examples, the individual electrode 118 may lack the electrolytic Au plated film 193 in one or more portions. For example, the first electrode portion 1181 may have a two-layer structure of a Ni sputtered film 191 and an electroless Ni plated film 192.

The common electrode 119 is formed on both the main surfaces of the substrate 111. The common electrode 119 applies the same drive voltage to all of the plurality of piezoelectric bodies 1133. The common electrode 119 is formed by a wiring pattern portion formed on the substrate 111 and a wiring pattern portion formed on the actuator 113. The common electrode 119 is a wiring pattern provided from the inner peripheral surface of the supply port 1111 of the substrate 111 to a piezoelectric body 1133 forming the air chambers 1132. The common electrode 119 is connected to the circuit board 14. The common electrode 119 is drawn out from the air chamber 1132 to an area between the pair of actuators 113. That is, the common electrode 119 is formed by connecting electrodes portions from the plurality of air chambers 1132.

As a specific example, the common electrode 119 is deposited on the inner surface of each air chamber 1132, the inclined surface 1134 of the actuator 113, the area avoiding the individual electrodes 118 on the front surface 115 of the substrate 111, the back surface of the substrate 111, and the inner surface of the supply port 1111. A portion of the common electrode 119 formed on the inner surface of each air chamber 1132 is formed on a side surface of the piezoelectric body 1133 forming each air chamber 1132 and a bottom surface of the groove forming each air chamber 1132.

As a specific example, the common electrode 119 is provided on the inclined surface 1134 from inside each air chamber 1132 toward the central portion of the substrate 111 and on the front surface 115 of the substrate 111 between the pair of actuators 113 and the inner peripheral surface of the supply port 1111. In addition, the common electrode 119 is also formed on the back surface 117 of the substrate 111. For example, the common electrode 119 extends to the edge of the substrate 111 in the lateral direction, and the end is arranged at the connection portion 1116 to which the circuit board 14 of the substrate 111 is connected.

In other words, the common electrode 119 is provided between the pair of actuators 113 and extends to the connection portion 1116 formed at an end of the substrate 111. A portion of the common electrode 119 extends in the thickness direction of the substrate 111 on the inner peripheral surface of the supply port 1111. In addition, a portion of the common electrode 119 is provided on the front surface of the piezoelectric member forming each air chamber 1132. Furthermore, a portion of the common electrode 119 is provided on the back surface 117 of the substrate 111.

That is, the common electrode 119 includes a plurality of first electrode portions 1191 formed in the grooves constituting the air chambers 1132 of the actuator 113, at least one second electrode portion 1192 formed on the inclined surface 1134 of the actuator 113, the third electrode portion 1193 formed on the front surface 115 of the substrate 111, the fourth electrode portion 1194 formed on the inner peripheral (sidewall) surface of the supply port 1111 and/or the discharge port 1112, and the fifth electrode portion 1195 formed on the back surface 117 of the substrate 111. The plurality of first electrode portions 1191, the second electrode portion(s) 1192, the third electrode portion 1193, the fourth electrode portion 1194 and the fifth electrode portion 1195 of the common electrode 119 are connected to each other. In some examples, the first electrode portion 1191 may extend to the end in the longitudinal direction on the front surface 115 of the substrate 11, and to the fourth electrode portion 1194 or instead of just the fourth electrode portion 1194. An electrode portion may be formed on the longitudinal end surface of the substrate 111, and the common electrode 119 may connect with the fifth electrode portion 1195 on the back surface 117 through this electrode portion on the end surface of the substrate. Each of the electrode portions 1191 to 1195 of the common electrode 119 are formed avoiding the individual electrodes 118. In addition, each of the electrode portions 1191 to 1195 of the common electrode 119 may be partially formed on the front surface of the substrate 111 or the actuator 113.

For example, the fifth electrode portion 1195 can be formed on the back surface of the substrate 111 at least at the position facing the opening (second liquid hole) of the first temperature control flow path 1213 of the manifold 121 through which the temperature control fluid (second liquid) flows. The fifth electrode portion 1195 may be formed on, for example, the entire back surface of the substrate 111. It is noted that, as long as the fifth electrode portion 1195 is connected with the third electrode portion 1193 through the fourth electrode portion 1194 or the like and is formed at the position facing at least the opening of the first temperature control flow path 1213 on the back surface of the substrate 111, the fifth electrode portion 1195 may be formed on any portion of the back surface of the substrate 111. It is noted that, from the viewpoint of securing the area of the common electrode 119, it is preferable that the fifth electrode portion 1195 of the common electrode 119 be formed over the entire back surface of the substrate 111 or over as wide a range of the back surface of the substrate 111 as feasible in view of any other constraints.

In the common electrode 119, the third electrode portion 1193 on the front surface 115 and the fifth electrode portion 1195 on the back surface 117 are connected by the fourth electrode portion 1194 inside the supply port 1111. It is noted that the common electrode 119 may extend to the ends (edges) of the front surface 115 of the substrate 111 in the longitudinal direction and continue to the back surface at the end surfaces of the substrate 111 in the longitudinal direction.

The common electrode 119 is provided so as to be in close contact with the bottom of the air chamber 1132 and the front surface of the piezoelectric member forming the piezoelectric body 1133. The common electrode 119 can have a multi-layer structure where, for example, a Ni sputtered film 191, an electroless Ni plated film 192, and an electrolytic Au plated film 193 are stacked. For example, the electrode film constituting the common electrode 119 has a three-layer stacked structure of the Ni sputtered film 191, the electroless Ni plated film 192, and the electrolytic Au plated film 193 on the front side and a two-layer stacked structure of the Ni sputtered film 191 and the electrolytic Au plated film 193.

For example, each of the first electrode portion 1191, the second electrode portion 1192, and the third electrode portion 1193 may have a three-layer stacked structure of a Ni sputtered film 191, an electroless Ni plated film 192, and an electrolytic Au plated film 193. In some examples, the first electrode portion 1191 inside the groove may have just a two-layer structure of a Ni sputtered film 191 and an electroless Ni plated film 192.

Each of the fourth electrode portion 1194 and the fifth electrode portion 1195 may have a two-layer stacked structure of a Ni sputtered film 191 and an electrolytic Au plated film 193. In addition, similarly to the first electrode portion 1191, the second electrode portion 1192, and the third electrode portion 1193, the fourth electrode portion 1194 and the fifth electrode portion 1195 may have a three-layer stacked structure of a Ni sputtered film 191, an electroless Ni plated film 192, and an electrolytic Au plated film 193.

The thickness of the common electrode 119 is, for example, 0.5 μm to 5 μm. It is noted that the thickness of the common electrode 119 is generally configured to be larger than the thickness of the individual electrodes 118. The common electrode 119 is typically configured to have lower resistance per unit length or the like than the individual electrodes 118. In other words, the thickness of the individual electrodes 118 is usually less than the thickness of the common electrode 119. The individual electrode 118 may have a higher resistance value per unit length or the like than the common electrode 119.

As illustrated in FIGS. 1, 3, 4, and 8, the manifold unit 12 includes the manifold 121, a top plate 122, an ink supply tube 123, an ink discharge tube 124, a first temperature control fluid supply tube 125, a first temperature control fluid discharge tube 126, and a shielding member 127. It is noted that the number of the ink supply tubes 123, the ink discharge tubes 124, the first temperature control fluid supply tubes 125, and the first temperature control fluid discharge tubes 126 can be appropriately varied.

The manifold 121 is formed in a plate shape or a block shape. The manifold 121 includes a supply flow path 1211 that connects with the supply port 1111 of the substrate 111 and forms a liquid supply flow path (which is a portion of the second flow path), a discharge flow path 1212 that connects with the discharge port 1112 of the substrate 111 and forms the liquid discharge flow path (that is a portion of the second flow path). The manifold 121 also includes a first temperature control flow path 1213 that forms part of the flow path of temperature control fluid. It is noted that, since the manifold 121 is connected to a pair of head bodies 11, the manifold 121 has a pair of supply flow paths 1211 and a pair of discharge flow paths 1212.

The manifold 121 is formed, for example, by assembling a plurality of manifold members to form the supply flow path 1211, the discharge flow path 1212, and the first temperature control flow path 1213.

One main surface of the manifold 121 is fixed to the back surface 117 of the substrate 111 through the shielding member 127. In addition, the top plate 122 is fixed to the manifold 121 opposite to the substrate 111. The ink supply tube 123, the ink discharge tube 124, the first temperature control fluid supply tube 125 and the first temperature control fluid discharge tube 126 are fixed to the manifold 121 through the top plate 122.

The supply flow path 1211 is formed in the manifold 121 by holes and grooves. The supply flow path 1211 includes a hole (first liquid hole) that opens to the main surface of the manifold 121 facing the substrate 111. For example, the supply flow path 1211 is a cuboidal liquid chamber extending along the longitudinal direction of the actuator 113 and the longitudinal direction of the supply port 1111. The supply flow path 1211 fluidly connects the ink supply tube 123 and the supply port 1111 of the substrate 111.

The discharge flow path 1212 is formed in the manifold 121 by holes and grooves. The discharge flow path 1212 includes a hole (first liquid hole) that opens to the main surface of the manifold 121 facing the substrate 111. The discharge flow path 1212 fluidly connects the ink discharge tube 124 and the discharge port 1112 of the substrate 111.

The first temperature control flow path 1213 is formed in the manifold 121 by holes or grooves. The first temperature control flow path 1213 has a groove formed in the surface of the manifold 121 facing the substrate 111, and the opening of the groove is covered with the shielding member 127. As the example, the first temperature control flow path 1213 is formed with one opening (second liquid hole) 12131 for each actuator 113. For example, the two openings 12131 of the first temperature control flow path 1213 are arranged on the side of the actuator 113 on the discharge side of the pressure chamber 1131 and extend along the longitudinal direction of the actuator 113. For example, the two openings 12131 of the first temperature control flow path 1213 are formed at the respective positions facing the back surface 117 of the substrate 111 on the side surface side of the substrate 111 in the lateral direction (Y direction) from the central side of the substrate 111 where the supply port 1111 is formed. The first temperature control flow path 1213 fluidly connects the temperature control fluid supply tube 125 and the temperature control fluid discharge tube 126.

The ends of the first temperature control flow path 1213 are openings connected to the temperature control fluid supply tube 125 and the temperature control fluid discharge tube 126 provided on the surface of the manifold 121. In addition, the first temperature control flow path 1213 is formed so as to be able to exchange heat through the shielding member 127 with the substrate 111 fixed to the manifold 121. The temperature control fluid flows through the first temperature control flow path 1213 to promote heat exchange.

The top plate 122 is provided on the surface of the manifold 121 opposite to the surface on which the substrate 111 is provided. In addition, the top plate 122 also has openings that connect the tubes 123, 124, and 125 and allow the tubes 123, 124, and 125 and the flow paths 1211 and 1213 to connect with each other.

The ink supply tube 123 is connected to the supply flow path 1211. The ink discharge tube 124 is connected to the discharge flow path. The temperature control fluid supply tube 125 and the temperature control fluid discharge tube 126 are connected to the primary side and the secondary side of the first temperature control flow path 1213.

In the present embodiment, the pair of ink supply tubes 123 and the first temperature control fluid discharge tube 126 are arranged on one end side of the manifold 121 in the longitudinal direction, and the pair of ink discharge tubes 124 and the first temperature control fluid supply tube 125 are arranged on the other end side of the manifold 121 in the longitudinal direction. It is noted that the arrangement and number of the ink supply tube 123, the ink discharge tube 124, the first temperature control fluid supply tube 125, and the first temperature control fluid discharge tube 126 are not limited to this example.

The shielding member 127 covers at least the two openings 12131 of the first temperature control flow path 1213 formed on the surface of the manifold 121 facing the substrate 111. The shielding member 127 covers the two openings 12131 to prevent the temperature control fluid flowing through the first temperature control flow path 1213 from being in contact with the common electrode 119 on the substrate 111. The shielding member 127 is made of a material that is corrosion resistant with respect to the temperature control fluid. The shielding member 127 is formed in a film shape or a sheet shape.

One shielding member 127 or, alternatively, the same number of the shielding members 127 as the number of the openings 12131 formed in the main surface of the manifold 121 of the first temperature control flow path 1213 can be provided. If just one shielding member 127 is provided, this shielding member 127 can be provided on a partial area including the two openings 12131 on the surface of the manifold 121 or over the entire area of the surface of the manifold 121. It is noted that, if separate shielding members 127 are provided for each of the openings 12131, each shielding members 127 may respectively cover one of the openings 12131, respectively.

Figure 8:
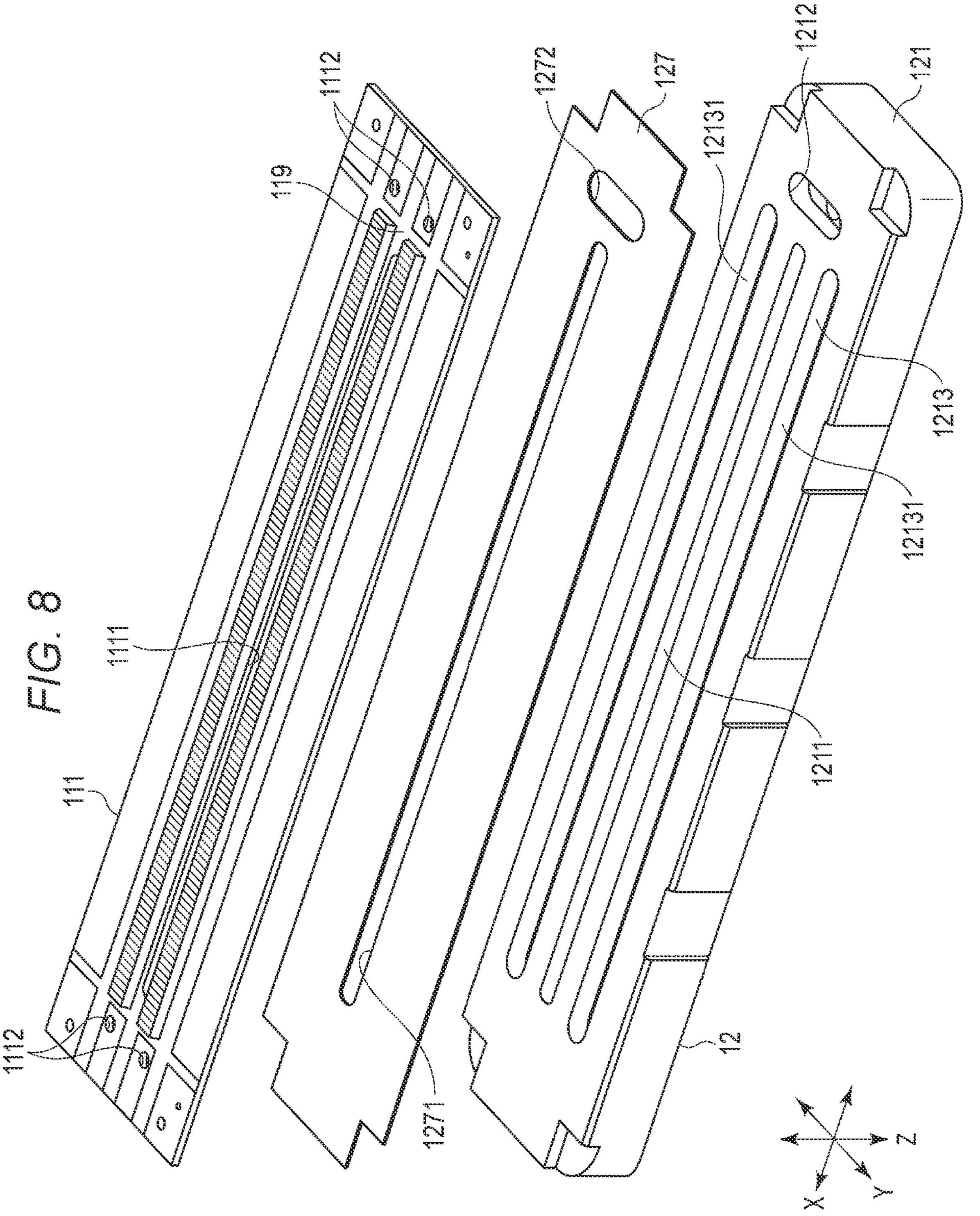
FIG. 8 is a perspective view of a portion of a head body.

In a specific example illustrated in FIG. 8, a single shielding member 127 is provided, and the shielding member 127 covers the two openings 12131 and no through-holes are formed in the regions facing the two openings 12131. The shielding member 127 is formed, in this example, in the same shape as the outer edge shape of the surface of the manifold 121 facing the substrate 111 or the outer edge shape of the back surface 117 of the substrate 111 and covers the region of the surface of the manifold 121 facing the electrode portion 1195.

A first through-hole 1271 and a second through-hole 1272 are formed in the shielding member 127. The first through-hole 1271 allows the supply port 1111 of the substrate 111 and the supply flow path 1211 formed in the manifold 121 to communicate with each other. The first through-hole 1271 is formed in a region of the shielding member 127 facing the supply port 1111 and the supply flow path 1211. The first through-hole 1271 is, for example, an elongated hole formed in the same shape as the opening of the supply port 1111 and/or the opening of the supply flow path 1211.

The second through-hole 1272 allows the discharge port 1112 of the substrate 111 and the discharge flow path 1212 formed in the manifold 121 to communicate with each other. The second through-hole 1272 is formed in a region of the shielding member 127 facing the discharge port 1112 and the discharge flow path 1212. For example, one second through-hole 1272 is formed on one end of the shielding member 127 in the longitudinal direction (X direction) and is an elongated hole extending in the lateral direction (Y direction), facing the two discharge ports 1112 formed on one end side of the substrate 111 in the longitudinal direction (X direction) of the four discharge ports 1112 formed in the substrate 111. In this example, the two discharge ports 1112 that do not face the second through-holes 1272 are covered and blocked by the shielding member 127.

It is noted that the second through-holes 1272 may be at both ends of the shielding member 127 in some examples. In addition, the second through-hole 1272 may be in the same shape as the discharge port 1112 instead of being an elongated hole, and second through-holes 1272 may be formed to face the respective discharge ports 1112.

The shielding member 127 is attached to the substrate 111 and the manifold 121 with adhesive, for example. The shielding member 127 can be made of a material having a linear expansion coefficient close to that of the substrate 111 and the manifold 121 material. As a specific example, a difference between the linear expansion coefficient of the shielding member 127 and the linear expansion coefficient of the substrate 111 and a difference between the linear expansion coefficient of the shielding member 127 and the linear expansion coefficient of the manifold 121 can be $25\times10^{-6}$ (/K) or less.

The shielding member 127 can be made of a material with a high thermal conductivity, for example, a material with a thermal conductivity of 0.15 W/(m·K) or more. In addition, the shielding member 127 can be made of, for example, a non-conductive material.

As a specific example, the shielding member 127 is made of a polyimide film. From the viewpoint of thermal conduction, the polyimide film forming the shielding member 127 preferably has a thermal conductivity of 0.15 W/(m·K) or more and a thickness of 0.1 mm or less.

It is noted that the shielding member 127 may be made of other materials besides a polyimide film. For example, if the substrate 111 and the manifold 121 are made of ceramics, a configuration may be used where shielding member 127 is made of ceramics so the linear expansion coefficients are close to each other. From the viewpoint of thermal conduction, it is preferable that the ceramic material forming the shielding member 127 has a thermal conductivity of 25 W/(m·K) or more and a thickness of 0.5 mm or less.

As a specific example, if the substrate 111 and the manifold 121 are alumina and the shielding member 127 is a polyimide film, a difference between the linear expansion coefficient of the shielding member 127 and the linear expansion coefficient of the substrate 111 and a difference between the linear expansion coefficient of the shielding member 127 and the linear expansion coefficient of the manifold 121 is $25\times10^{-6}$ (/K) or less. In addition, if the substrate 111 and the manifold 121 are made of alumina and the shielding member 127 can be made of ceramics as well, a difference between the linear expansion coefficient of the shielding member 127 and the linear expansion coefficient of the substrate 111 and a difference between the linear expansion coefficient of the shielding member 127 and the linear expansion coefficient of the manifold 121 is $5\times10^{-6}$ (/K) or less. The shielding member 127 can be alumina.

It is noted that these described materials of the shielding member 127 are merely non-limiting examples. However, from the viewpoint of adhesion, it is preferable that the differences between the linear expansion coefficients of the substrate 111 and the manifold 121 and the linear expansion coefficient of the shielding member 127 are preferably set within the above-mentioned range, and it is preferable that, from the viewpoint of temperature control, a heat transfer coefficient and a thickness of the shielding member 127 are within a numerical range in which heat can be effectively transferred between the temperature control fluid and the substrate 111.

The temperature control flow path unit 13 has a plurality of second temperature control flow paths 1312, a second temperature control fluid supply tube 133, and a second temperature control fluid discharge tube 134. A plurality of openings 1314 are formed between the plurality of second temperature control flow paths 1312 in the temperature control flow path unit 13. The temperature control flow path unit 13 is connected to the temperature control device 2116 of the liquid ejection apparatus 2. The second temperature control flow paths 1312 are long in the X direction and arranged in the Y direction perpendicular to the second temperature control flow paths 1312.

As a specific example, since the pair of head bodies 11 are provided in the present embodiment, four nozzle rows 1142, four actuators 113, and four driver ICs 142 are provided. With this arrangement, the temperature control flow path unit 13 has three second temperature control flow paths 1312, and two openings 1314 are formed between the second temperature control flow paths 1312.

The plurality of second temperature control flow paths 1312 are connected to the second temperature control fluid supply tube 133 and the second temperature control fluid discharge tube 134.

In the temperature control flow path unit 13, a portion of the driver IC 142 of the circuit board 14 and a printed wiring board 143 are arranged in the openings 1314, and the plurality of second temperature control flow paths 1312 are arranged to face the driver IC 142 (which acts in this context as a heating element), so that cooling of the driver IC 142 is performed.

As illustrated in FIGS. 3 and 4, the circuit board 14 includes the driver IC 142 of which is connected to the connection portion 1116 of the substrate 111 and the printed wiring board 143.

The circuit board 14 drives the actuator 113 by applying a drive voltage to the wiring pattern for the actuator 113 from the driver IC 142. The applied voltage increases or decreases the volume of the pressure chamber 1131, and acts to eject liquid droplets from the nozzle 1141.

The driver IC 142 is connected to the plurality of individual electrodes 118 and the common electrode 119 through the ACF (anisotropic conductive film) fixed to the connection portion of the substrate 111 by thermocompression. The driver IC 142 generates heat during operation. It is noted that the driver IC 142 may be connected to the plurality of individual electrodes 118 and the common electrode 119 by other means such as ACP (anisotropic conductive paste), NCF (non-conductive film), and NCP (non-conductive paste). The plurality of driver ICs 142 to be connected are provided, for example, for each head body 11. In the present embodiment, driver ICs 142 are connected to each actuator 113. The driver IC 142 is, for example, a COF (chip on film) in which an IC chip is mounted on a film. The front surface of the driver IC 142 is in contact with the outer surface of the second temperature control flow path 1312.

The printed wiring board 143 is a PWA (printing wiring assembly) on which various electronic components and connectors are mounted.

The cover 15 includes, for example, an outer shell 151 covering the side surfaces of the pair of head bodies 11, the manifold unit 12, and the circuit board 14 and a mask plate covering a portion of the pair of head bodies 11 on the nozzle plate 114 side.

The outer shell 151 exposes, for example, the ink supply tube 123, the ink discharge tube 124, the temperature control fluid supply tube 125, and the temperature control fluid discharge tube of the manifold unit 12 and the end of the circuit board 14 to the outside.

The mask plate covers the pair of head bodies 11 except for the nozzles 1141 and the nozzle plate 114 surrounding the nozzles 1141.

The liquid ejection head 1 has a plurality of individual electrodes 118 for individually applying a drive voltage to each of the piezoelectric bodies 1133 and a common electrode 119 capable of applying a drive voltage to all the piezoelectric bodies 1133 in the head body 11.

The liquid ejection head 1 can drive the plurality of pressure chambers 1131 selectively in groups, individually, or collectively (all simultaneously). When a pressure chamber 1131 is driven, the pressure chamber 1131 is deformed in a shear-mode, and thus, the ink in the pressure chamber 1131 is pressurized (compressed). Therefore, the liquid ejection head 1 can selectively eject the ink from the nozzles 1141 facing the pressure chambers 1131.

The common electrode 119 is also formed on the front surface 115 of the actuator 113, the inclined surface 1134 of the actuator 113, the inner surface of the air chamber 1132, and the inner peripheral surface of the supply port 1111 formed in the substrate 111.

The liquid ejection head 1 has the first temperature control flow path 1213 for controlling the temperature of the head body 11 and the second temperature control flow path 1312 for cooling the driver IC 142 using the manifold unit 12 and the temperature control flow path unit 13. The temperature control fluid supplied from the second temperature control fluid supply tube 133 is discharged from the second temperature control fluid discharge tube 134 through the first temperature control flow path 1213 and the second temperature control flow path 1312. The temperature control fluid flowing through the first temperature control flow path 1213 cools the substrate 111 through the shielding member 127 for controlling the temperature of the head body 11, and the temperature control fluid flowing through the second temperature control flow path 1312 cools the driver IC 142.

A liquid ejection apparatus 2 incorporating a liquid ejection head 1 will be described with reference to FIG. 15. The liquid ejection apparatus 2 includes a housing 2111, a medium supply unit 2112, an image formation unit 2113, a medium discharge unit 2114, a conveying device 2115 as a media support, a maintenance device 2117, and a control unit 2118. The liquid ejection apparatus 2 also includes a temperature control device that controls the temperature of the ink supplied to the liquid ejection head 1.

The liquid ejection apparatus 2 can be an inkjet printer that performs an image forming process on paper P by ejecting a liquid such as ink while conveying a recording medium to be ejected, for example, the paper P, along a predetermined conveyance path 2001 from the medium supply unit 2112 to the medium discharge unit 2114 through the image formation unit 2113.

The medium supply unit 2112 has a plurality of paper feed cassettes 21121. The image formation unit 2113 includes a support unit 2120 that supports the paper and a plurality of head units 2130 above the support unit 2120. The medium discharge unit 2114 includes a paper discharge tray 21141.

The support unit 2120 includes a conveying belt 21201 provided in a loop shape, a support plate 21202 supporting the conveying belt 21201 from the back side, and a plurality of belt rollers 21203 provided on the back side of the conveying belt 21201.

The head unit 2130 includes a plurality of liquid ejection heads 1, a plurality of supply tanks 2132 mounted on the respective liquid ejection heads 1, a pump 2134 that supplies the ink, and a connection flow path 2135 that connects the liquid ejection heads 1 to the supply tanks 2132.

In the present embodiment, the liquid ejection heads 1 are provided for four colors, cyan, magenta, yellow, and black along with four supply tanks 2132 containing the ink of respective colors. A supply tank 2132 is connected to a liquid ejection head 1 by a connection flow path 2135.

The pump 2134 is, for example, a liquid feed pump such as a piezoelectric pump. The pump 2134 is connected to the control unit 2118 and driven and controlled by the control unit 2118.

The connection flow path 2135 has a supply flow path connected to the ink supply tube 123 of the liquid ejection head 1. In addition, the connection flow path 2135 includes a recovery flow path connected to the ink discharge tube 124 of the liquid ejection head 1. For example, if the liquid ejection head 1 is of the non-circulating type, a recovery circuit is connected to a maintenance device 2117, and if the liquid ejection head 1 is of the circulating type, the recovery flow path is connected to the supply tank 2132.

The conveying device 2115 conveys the paper P along the conveyance path 2001 from the paper feed cassette 21121 to the paper discharge tray 21141 through the image formation unit 2113. The conveying device 2115 includes a plurality of guide plate pairs 21211 to 21218 arranged along the conveyance path 2001 and a plurality of conveying rollers 21221 to 21228. The conveying device 2115 supports the paper P and moves the paper P relative to the liquid ejection head 1.

The temperature control device 2116 has the temperature control fluid tank 21161, the temperature control circuit 21162 (in this context, the "circuit" comprises components such as pipes and tubes) for supplying the temperature control fluid, the pump for supplying the temperature control fluid, the cooler and/or the heater for controlling the temperature of the temperature control fluid, and the like. The temperature control device 2116 supplies the temperature control fluid from the temperature control fluid tank 21161 at a predetermined temperature by using the cooler, the heater, or the like to the second temperature control fluid supply tube 133 through the temperature control circuit 21162 using the pump. In addition, the temperature control device 2116 recovers the temperature control fluid discharged from the second temperature control fluid discharge tube 134 through the first temperature control flow path 1213 and the second temperature control flow path 1312 into the temperature control fluid tank 21161 through the temperature control circuit 21162.

The maintenance device 2117, for example, suctions and recovers the ink remaining on the outer surface of the nozzle plate 114 during a maintenance operation. In addition, if the liquid ejection head 1 is of the non-circulating type, the maintenance device 2117 recovers the ink from inside the head body 11 during a maintenance operation. The maintenance device 2117 has a tray, a tank, or the like for storing the recovered ink.

The control unit 2118 includes a CPU 21181 (as an example of a processor), a memory such as a ROM (read only memory) for storing various programs, and a RAM (random access memory) for temporarily storing various variable data and image data, and an interface unit for receiving data (input) from the outside and outputting data to the outside.

In the liquid ejection head 1 and the liquid ejection apparatus 2, the opening 12131 of the first temperature control flow path 1213 formed on the surface of the manifold 121 facing the back surface 117 of the substrate 111 is covered with the shielding member 127. In addition, the common electrode 119 formed at the position facing the opening 12131 of the first temperature control flow path 1213 is covered with the shielding member 127. Therefore, since the common electrode 119 is not in contact with the temperature control fluid, the liquid ejection head 1 can avoid corrosion of the common electrode 119 while still maintaining the cooling performance of the temperature control fluid. Therefore, the liquid ejection head 1 can prevent the common electrode 119 from being corroded by electrolysis during operation of the liquid ejection head 1 with the temperature control fluid in contact with the common electrode 119 and can prevent the resistance of the common electrode 119 from increasing due to corrosion. Thus, the liquid ejection head 1 can prevent the driver IC 142 from being damaged due to latch-up or the like. In addition, the liquid ejection head 1 can avoid differences in a drive waveform from being applied to the end portions and the center portion of the actuator row and can maintain good printing quality such as dot diameter and linearity.

The shielding member 127 may avoid peel off from the substrate 111 and the manifold 121 when the difference in the linear expansion coefficient between shielding member 127 and the substrate 111 and the manifold 121 is within the above-described ranges.

In addition, the shielding member 127 can have the same shape as the outer edge shape of the main surface of the manifold 121 facing the substrate 111 or the outer edge shape of the back surface 117 of the substrate 111, so that the shielding member 127 can cover two openings of the first temperature control flow path 1213 formed in the main surface of the manifold 121. In addition, the shielding member 127 has the same shape as the outer edge shape of the main surface of the manifold 121 facing the substrate 111 or the outer edge shape of the back surface 117 of the substrate 111, so that the shielding member 127 can easily perform position alignment when being attached to the substrate 111 and the manifold 121. Therefore, the liquid ejection head 1 can be produced without additional manufacturing difficult.

In an embodiment, in the liquid ejection head 1 and the liquid ejection apparatus 2, corrosion of the common electrode 119 can be prevented by covering the opening of the first temperature control flow path 1213 (through which the temperature control fluid flows) and the common electrode 119 facing the opening of the first temperature control flow path 1213 with the shielding member 127.

It is noted that the embodiments of the present disclosure are not limited to the specific configurations described above. In an example, a single shielding member 127 is provided that has the same shape as the outer edge shape of the main surface of the manifold 121 facing the substrate 111 or the outer edge shape of the back surface 117 of the substrate 111, but the present disclosure is not limited thereto. For example, even in a case where one shielding member 127 is used, if all the openings 12131 can still be covered, the shape of the shielding member 127 may be different from the outer edge shape of the main surface of the manifold 121 facing the substrate 111 or the outer edge shape of the back surface 117 of the substrate 111. In addition, multiple shielding members 127 may be used to cover the openings of the first temperature control flow paths 1213 formed on the main surface of the manifold 121, and each of these shielding members 127 may separately cover one or a subset of the openings of the first temperature control flow paths 1213. In another example, the number of openings 12131 may be provided to face a portion of the common electrode 119 can be varied as appropriate.

Although an example is described where the shielding member 127 prevents the temperature control fluid from contacting the common electrode 119, the present disclosure is not limited thereto. That is, the liquid blocked by the shielding member 127 may be any liquid that might corrode the common electrode 119. It is noted that preferably the material forming the shielding member 127 is a material that is corrosion resistant with respect to the liquid to be shielded.

That is, in a case where the shielding member 127 is configured to cover a portion of the common electrode 119 and the opening of the flow path of the liquid corroding the common electrode 119 if the common electrode 119 is in contact with the liquid, the shape and number of the shielding member 127, the common electrode 119, and the openings (for example, the openings 12131 of the first temperature control flow path 1213) of the flow path of the liquid can be set as appropriate.

In an example, the supply port 1111 is an elongated hole is arranged between the pair of actuators 113 and the discharge port 1112 is arranged at both ends of the pair of actuators 113 in the longitudinal direction, but in other examples, the shape, number, and arrangement of the supply port 1111 and the discharge port 1112 can be varied as appropriate.

In an example, the common electrode 119 a portion of the common electrode 119 may be formed on the inner wall of the discharge port 1112 in addition to the fourth electrode portion 1194 formed in the supply port 1111 or even instead of the fourth electrode portion 1194. In addition, a portion of the common electrode 119 may be formed on the end surface of the substrate 111. Furthermore, the substrate 111 may be formed with a through-hole for a portion of the common electrode 119 to be formed on the inner surface thereof. For example, the area of the common electrode 119 can be increased by the electrode film being formed on the discharge port 1112, the end surface, and/or a through-hole, and the resistance value can be further reduced. However, if a portion of the common electrode 119 faces the flow path through which a corroding liquid (second liquid) flows, the shielding member 127 can be configured to cover the flow path and the common electrode 119 facing the flow path.

In an example, the individual electrode 118 is formed in the pressure chamber 1131 and the common electrode 119 is formed in the air chamber 1132, but, in other examples, the common electrode 119 may be formed in the pressure chamber 1131, and the individual electrode 118 may be formed in the air chamber 1132.

In an example, liquid ejection head 1 is an independently driven type head and, among the common electrodes 119 that are the electrode portions formed over the front and back main surfaces of the substrate 111, the common electrode 119 on the back surface of the substrate 111 is covered with the shielding member 127, but the present disclosure is not limited thereto. For example, a configuration may be adopted in which some electrode other than the common electrode is provided on a part of the back surface 117 of the substrate 111 and this other electrode may be covered with the shielding member 127. That is, the liquid ejection head 1 can prevent corrosion of any electrode type by covering the relevant electrode portion provided on the back surface 117 of the substrate 111 with the shielding member 127. With such a configuration, for example, even if the liquid ejection head 1 is a division-driving type head, corrosion of the electrode provided on the back surface 117 of the substrate 111 can be prevented.

In an example, the liquid ejection head 1 is provided with a pair of head bodies 11, but a configuration having one head body 11 may instead be adopted in other examples. Furthermore, although a configuration is described where the head body 11 has a pair of actuators 113, a configuration where the head body 11 has just one actuator 113 may be adopted in other examples.

The liquid ejection head 1 can be of a non-circulating type or of a circulating type.

In an example, an inkjet head 1 in which one side of the pressure chamber 1131 is the supply side, the other side is the discharge side, and the ink flows in from one side of the pressure chamber 1131 and flows out from the other side is exemplified, but the present disclosure is not limited thereto. In other examples, common chambers on both sides of the pressure chamber 1131 can function as the supply side and the ink inflows from both sides may be adopted. In addition, the supply side and the discharge side may be reversed or may be configured to be switchable in other examples.

In an example, a side shooter type inkjet head is exemplified, but the present disclosure is not limited to this, and an end-shooter type inkjet head may be used in other examples.

In The liquid to be ejected is not limited to printing ink, and a device for ejecting liquid containing conductive particles for forming a wiring pattern of a printed wiring board may be provided according to the present disclosure.

In an example, the inkjet head 1 is used in the liquid ejection apparatus 2 such as an inkjet printer, the present disclosure is not limited thereto and the inkjet head 1 or the like can also be used in, for example, 3D printers, industrial manufacturing machines, and medical applications and can reduce the size, weight, and cost of such devices.

According to at least one of the embodiments described above, the flow path through which a potentially corrosive liquid flows can be prevented from contacting an electrode element (e.g., the common electrode) otherwise exposed to the corrosive liquid flow path by being covered with a shielding member, so that corrosion of the electrode can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:
- a substrate with a hole;
- a nozzle plate with a plurality of nozzles;
- an actuator on a first surface of the substrate, the actuator having a plurality of pressure chambers aligned to the plurality of nozzles;
- an electrode having a first portion on the first surface of the substrate and a second portion on a second surface of the substrate, the second surface being on an opposite side of the substrate from the first surface;
- a manifold with a first liquid hole facing the hole in the substrate and a second liquid hole facing another portion of the substrate other than the hole; and
- a shielding member between the substrate and the manifold and covering the second liquid hole.

2. The liquid ejection head according to claim 1, wherein the manifold includes:
- a first liquid flow path for a first liquid, the first liquid flow path connected to the first liquid hole, and
- a second liquid flow path for a second liquid different from the first liquid, the second liquid flow path connected to the second liquid hole.

3. The liquid ejection head according to claim 1, wherein the shielding member includes a through-hole connecting the hole in the substrate and the first liquid hole in the manifold.

4. The liquid ejection head according to claim 1, wherein the shielding member is a polyimide film.

5. The liquid ejection head according to claim 1, wherein the shielding member is ceramic.

6. The liquid ejection head according to claim 1, wherein the difference between a linear expansion coefficient of the shielding member and a linear expansion coefficient of the substrate is $25\times10^{-6}$ (/K) or less.

7. The liquid ejection head according to claim 6, wherein the difference between a linear expansion coefficient of the manifold and the linear expansion coefficient of the shielding member is $25\times10^{-6}$ (/K) or less.

8. The liquid ejection head according to claim 1, wherein
- the second portion of the electrode covers substantially the entire second surface of the substrate, and
- the shielding member covers substantially the entire second portion of the electrode.

9. The liquid ejection head according to claim 8, wherein the shielding member has the same outer planar shape as the second surface of the substrate.

10. The liquid ejection head according to claim 8, wherein the shielding member has the same outer planar shape as a surface of the manifold facing the second surface of the substrate.

11. The liquid ejection head according to claim 1, wherein the shielding member has the same outer planar shape as the second surface of the substrate.

12. The liquid ejection head according to claim 1, wherein the difference between a linear expansion coefficient of the manifold and the linear expansion coefficient of the shielding member is $25\times10^{-6}$ (/K) or less.

13. A liquid ejection apparatus, comprising:
- a media support; and
- an inkjet head configured to eject liquid towards the media support, the inkjet head including:
  - a substrate with a hole;
  - a nozzle plate with a plurality of nozzles;
  - an actuator on a first surface of the substrate, the actuator having a plurality of pressure chambers aligned to the plurality of nozzles;
  - an electrode having a first portion on the first surface of the substrate and a second portion on a second surface of the substrate, the second surface being on an opposite side of the substrate from the first surface;
  - a manifold with a first liquid hole facing the hole in the substrate and a second liquid hole facing another portion of the substrate other than the hole; and
  - a shielding member between the substrate and the manifold and covering the second liquid hole.

14. The liquid ejection apparatus according to claim 13, wherein the manifold includes:
- a first liquid flow path for a first liquid, the first liquid flow path connected to the first liquid hole, and
- a second liquid flow path for a second liquid different from the first liquid, the second liquid flow path connected to the second liquid hole.

15. The liquid ejection apparatus according to claim 13, wherein the shielding member includes a through-hole connecting the hole in the substrate and the first liquid hole in the manifold.

16. The liquid ejection apparatus according to claim 13, wherein the shielding member is a polyimide film.

17. The liquid ejection apparatus according to claim 13, wherein the shielding member is ceramic.

18. The liquid ejection apparatus according to claim 13, wherein the difference between a linear expansion coefficient of the shielding member and a linear expansion coefficient of the substrate is $25\times10^{-6}$ (/K) or less.

19. The liquid ejection apparatus according to claim 18, wherein the difference between a linear expansion coefficient of the manifold and the linear expansion coefficient of the shielding member is $25\times10^{-6}$ (/K) or less.

20. The liquid ejection apparatus according to claim 13, wherein
- the second portion of the electrode covers substantially the entire second surface of the substrate, and
- the shielding member covers substantially the entire second portion of the electrode.

* * * * *